United States Patent [19]

Creagh et al.

[11] Patent Number: 4,877,676

[45] Date of Patent: Oct. 31, 1989

[54] HOT MELT INK TRANSPARENCY

[75] Inventors: Linda T. Creagh, West Lebanon; Steven F. Fulton, Hanover, both of N.H.; Paul A. Hoisington, Norwich, Vt.; Bruce A. Paulson, Lebanon; Robert R. Schaffer, Canaan, both of N.H.; Charles W. Spehrley, Jr., Hartford, Vt.

[73] Assignee: Spectra, Inc., Hanover, N.H.

[21] Appl. No.: 246,696

[22] Filed: Sep. 20, 1988

Related U.S. Application Data

[62] Division of Ser. No. 50,285, May 14, 1987, Pat. No. 4,801,473.

[51] Int. Cl.⁴ ........................... B32B 7/04; B32B 3/00

[52] U.S. Cl. .................................... 428/204; 428/172; 428/173; 428/201; 428/203; 428/212; 428/423.1; 428/423.7; 428/424.4; 428/480; 428/484

[58] Field of Search ............... 428/172, 203, 201, 173, 428/212, 204, 423.7, 424.4, 480, 484, 424.8, 423.1, 522

[56] References Cited

U.S. PATENT DOCUMENTS

| | | | |
|---|---|---|---|
| 1,872,999 | 11/1928 | McCarthy | 428/203 |
| 3,364,049 | 1/1968 | Deak et al. | 428/203 |
| 4,097,635 | 6/1978 | Sanz Hernandez et al. | 428/172 |
| 4,265,947 | 5/1981 | Shank, Jr. | 428/34.7 |
| 4,355,077 | 10/1982 | Chevreux et al. | 428/424.4 |
| 4,528,242 | 7/1985 | Burwasser | 428/413 |
| 4,547,405 | 10/1985 | Bedell et al. | 427/256 |
| 4,555,437 | 11/1985 | Tanck | 428/212 |
| 4,575,465 | 3/1986 | Viola | 427/261 |
| 4,578,285 | 3/1986 | Viola | 427/209 |
| 4,592,954 | 6/1986 | Malhotra | 428/335 |
| 4,666,757 | 5/1987 | Helinski | 428/203 |
| 4,705,721 | 11/1987 | Frisch et al. | 428/423.7 |

FOREIGN PATENT DOCUMENTS

| | | | |
|---|---|---|---|
| 3118755 | 5/1988 | Japan | 428/203 |

*Primary Examiner*—Ellis P. Robinson
*Assistant Examiner*—Archene A. Turner
*Attorney, Agent, or Firm*—Brumbaugh, Graves, Donohue & Raymond

[57] ABSTRACT

In the particular embodiments of the invention described in the specification, a transparency includes a transparent substrate made of a polyester material, an ink pattern disposed on one surface of the transparent sheet in the form of three-dimensional ink spots having curved surfaces and a transparent layer convering the ink spots which has an index of refraction approximately the same as that of the ink spots. The transparent layer is applied to the substrate and the ink spots in the form of a liquid coating which wets the surfaces of the substrate and ink spots and spreads over them to produce a transparent layer having a maximum deviation of about 20 degrees from a plane parallel to the substrate.

9 Claims, 1 Drawing Sheet

HOT MELT INK TRANSPARENCY

This application is a division of application Ser. No. 050,285, filed on May 14, 1987 U.S. Pat. No. 4,801,473.

BACKGROUND OF THE INVENTION

This invention relates to transparencies made with hot melt ink and to methods for making such transparencies.

Hot melt inks are used in thermal transfer printers and in certain ink jet printers. The characteristic of these inks is that they are solid at room temperature, liquified by heating for marking, and resolidified by freezing on the marked substrate.

Transparency substrates are made of transparent sheet material, such as a polyester material, which is not receptive to liquid materials such as ink. When solvent-based inks are used to make transparencies, the substrate is coated with a layer receptive to the ink and the ink is absorbed into the coating. For example, U.S. Pat. Nos. 4,528,242 to Burwasser, 4,547,405 to Bedell et al., 4,555,437 to Panck, 4,575,465 and 4,578,285 to Viola, and 4,592,954 to Malhotra disclose special coatings which are capable of absorbing inks for transparent base material such as Mylar. Hot melt inks, however, do not penetrate into the substrate or into a coating on the substrate but adhere to the surface and retain a three-dimensional form. In this way they are distinct from inks which are absorbed or dry into a flat spot through evaporation or absorption.

When projected from a transparency, the deposited three-dimensional ink spots tend to scatter transmitted light in the manner of a dioptric lenticule. The small lenticules formed by the three-dimensional ink spots refract light which passes through them away from the path to the projection lens so that they cast gray shadows in projection irrespective of the color of the ink which forms the lenticule.

Attempts have been made to overcome this problem by flattening the three-dimensional ink spots on the transparent substrate, but such flattening affects only the uppermost portions of the spot, leaving the peripheral portions of the spots curved so as to refract most of the light passing through the ink spots away from the path to the projection lens. Consequently, although flattening of three-dimensional ink spots in a transparency may produce a slight improvement, the images made in this manner are still unsatisfactory.

SUMMARY OF THE INVENTION

Accordingly, it is an object of the present invention to provide a new and improved form of ink transparency in which the above-mentioned disadvantages are overcome.

Another object of the invention is to provide a new and improved method for preparing ink transparencies which produces transparencies having improved characteristics.

These and other objects of the invention are attained by providing a transparent substrate, forming an ink pattern on the surface of the substrate which includes three-dimensional spots of solid ink having a curved surface, and coating the substrate surface with a transparent coating material which wets the ink spots and the substrate and has an index refraction approximately the same as the ink spots.

The resulting transparency according to the invention comprises a transparent substrate, a pattern of three-dimensional ink spots having a curved surface deposited on the surface of the substrate, and a transparent coating on the substrate and the ink spots made of a material which wets the substrate and the ink spots and which has an index of refraction approximately the same as that of the ink spots.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

In conventional transparency projectors, the transparency-illuminating optics are usually arranged with a reflector and a collecting lens so that light is transmitted through the transparency in approximately parallel rays, producing an image of the light source in the plane of the projection lens. In this way, except for light which has been scattered in other directions during its passage through the transparency and the illuminating system, substantially all of the illuminating light is collected by the projection lens so as to be useful in forming a projected image. If a substantial proportion of the light passing through each ink spot in the transparency pattern is scattered, the image projected by the projection lens will be deficient in contrast and color saturation, providing a generally gray, washed-out appearance.

Figure 1:
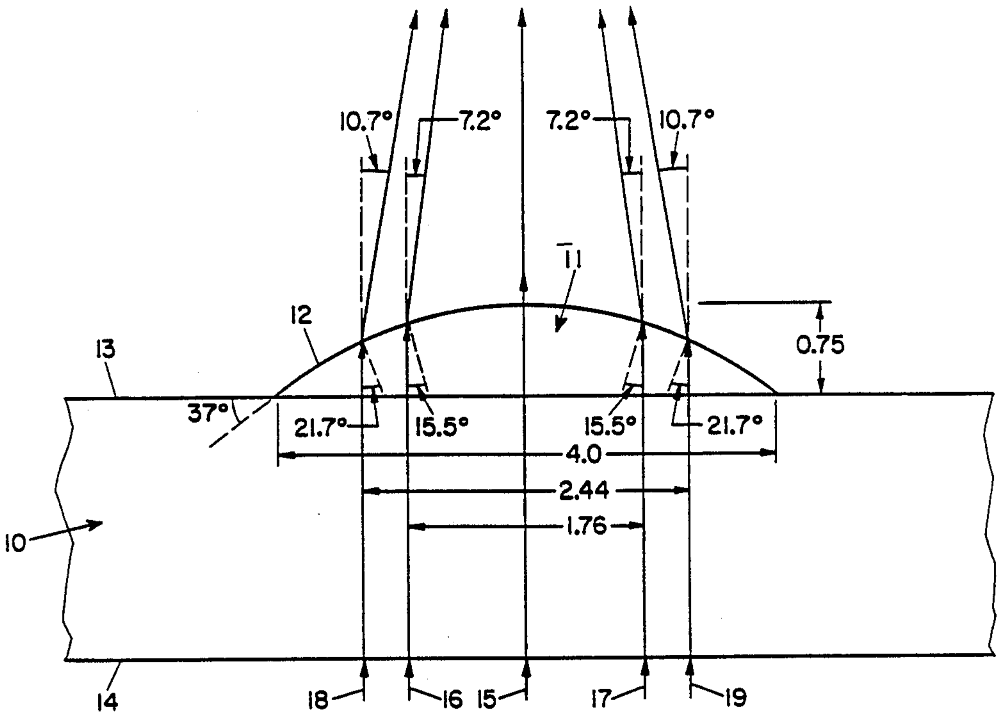
FIG. 1 is a schematic fragmentary sectional view illustrating the transmission of light through a transparency having a three-dimensional ink spot on one surface.

When an ink image is formed on a surface which cannot absorb the ink, such as when hot melt ink is used to make an image on a polyester sheet material, the ink solidifies in the form of three-dimensional spots which have a curved surface similar to he surface of a sphere. This is illustrated in FIG. 1, in which a transparent substrate 10 has a solidified ink spot in the shape of a segment of a sphere. In the illustrated example, the spot 11 has a diameter of about 4 mils, and a maximum thickness of about 0.75 mil, and the radius of its upper surface 12 is about 3.3 mils. Consequently, the surface 12 intersects the upper surface 13 of the substrate 10 at the periphery of the spot 11 at an angle of about 37 degrees.

In a projection system of the type mentioned above, the transparency is illuminated from the opposite side 14 by substantially parallel rays of light 15–19, which, in the example shown in FIG. 1, are incident in a direction approximately perpendicular to the surfaces 13 and 14 of the sheet 10. Essentially perpendicular incidence of the light rays will occur in the central region of the transparency, and at the periphery of the transparency the direction of illuminating light rays may deviate by a relatively small angle from the perpendicular, up to about 15 degrees, for example, depending upon the size of the transparency to be projected and the focal length of the projection lens. Consequently, while the quantitative effects described herein with reference to the illustration in FIG. 1 are applicable to ink spots in the central portion of a transparency being projected, the specific numerical values will differ somewhat for ink spots in the peripheral portions, but the same qualitative effects are applicable with respect to the ink spots in those portions of the transparency. In addition, it will be understood that the shape of each ink spot may deviate somewhat from the typical three-dimensional ink spot shape shown in FIG. 1.

Conventional hot melt inks of the type used in ink jet printing or thermal transfer of images have an index of refraction generally in the range of about 1.40 to 1.50. For purposes of the illustration, the three-dimensional ink spot 11 illustrated in FIG. 1 is assumed to have an index of refraction of 1.45. With that index of refraction, rays entering the spot 11 at a distance of about 44% of the radius of the spot outwardly from the central ray 15, such as rays 16 and 17 shown in FIG. 1, will be incident on the surface 12 at an angle of about 15.5 degrees from the perpendicular, and, upon passage through the surface 12, will be deviated by refraction toward the central ray 15 by an angle of 7.2 degrees. The extent of such deviation from the direction of incidence of the rays increases as the distance from the central ray increases, and rays entering at a distance from the central ray 15 which is 61% of the radius of the ink spot, such as rays 18 and 19, will be incident on the surface 12 and angles of about 21.7 degrees from the perpendicular, resulting in a deviation of those rays by 10.7 degrees toward the central ray 15 upon passage through the surface 12.

If the projection lens used in the transparency projection system has an aperture of f/4, which is about the maximum aperture normally used in such systems, the projection lens will subtend an angle of about 14.4 degrees from each point in the image being projected. Thus, if any ray directed toward the projection lens is deviated by more than 7.2 degrees from the line extending between the center of the projection lens and the point being imaged, it will not be collected by the projection lens and will not be useful in forming an image. Consequently, with ink spots in a transparency of the type shown in FIG. 1, only those rays incident on the spot at distances from the center which are less than 44% of the radius of the spot will be transmitted to the projection lens. Such rays comprise only 19.4% of all of the rays incident on the ink spot, resulting in a loss of more than 80% of the incident light.

Even if the aperture of the projection lens is enlarged by 50%, the problem resulting from refraction of rays by ink spots cannot be avoided. In that case, the projection lens would subtend an angle of 21.4 degrees from each spot and would receive rays entering at distances from the central ray 5 up to 61% of the radius of the spot, such as rays 18 and 19 illustrated in FIG. 1. In that case, the lens would receive only about 37% of the rays incident on the ink spot. Thus, even with a substantially larger projection lens, more than 60% of the light incident on each spot is lost. On the other hand, light incident on the substrate 10 where there is no ink spot 11 is fully transmitted to the projection lens, so that the resulting projected ink pattern is relatively dark and substantially colorless in contrast to the relatively brighter background in which no three-dimensional ink spots refract the incident light.

Figure 2:
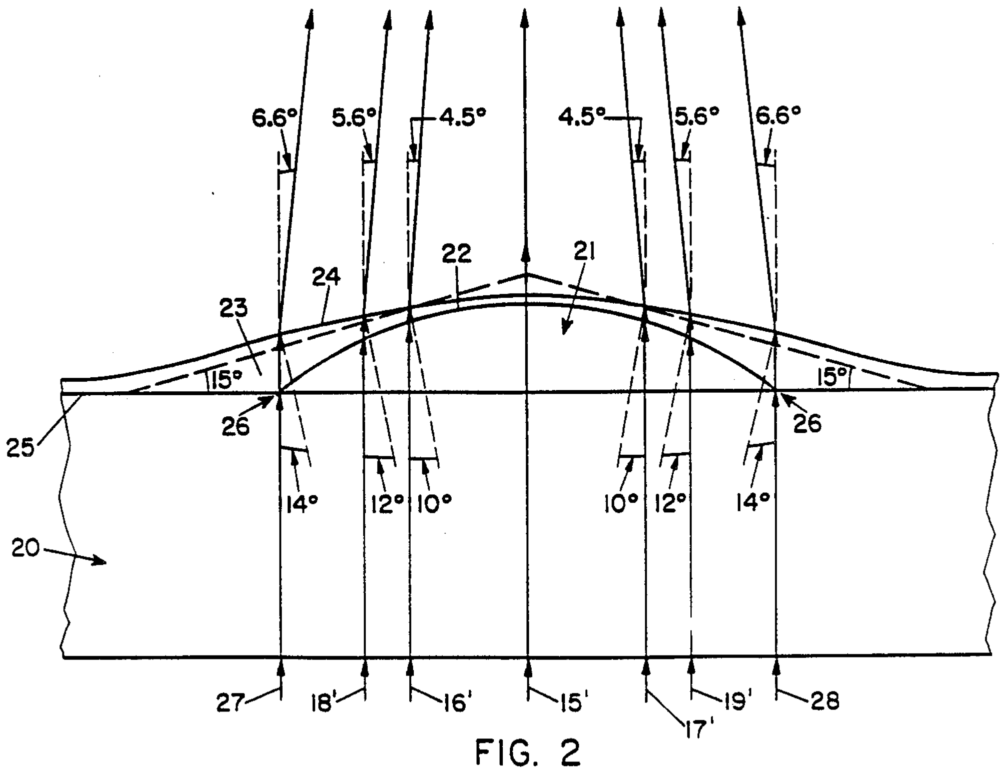
FIG. 2 is a schematic fragmentary sectional view of a transparency prepared in accordance with the present invention, illustrating the transmission of light rays through a three-dimensional ink spot and a transparent coating.

These problems, which have heretofore prohibited the preparation of good-quality transparencies using hot melt inks, have been overcome in accordance with the present invention by providing a transparency prepared in the manner illustrated in FIG. 2. As shown in FIG. 2, the transparency comprises a transparent substrate 20 to which a three-dimensional ink spot 21 having a curved surface 22 has been applied. Thereafter, a coating 23 of transparent material is applied to the substrate 20 and the ink spot 21 in such a way as to make optical contact with the surfaces of the substrate and the ink spot and form a surface 24 having a relatively small maximum angle of deviation from a plane parallel to the surface 25 of the substrate.

For this purpose, the layer 23, which is applied in liquid form, should be made of a material which wets the surface 25 of the substrate 20 and the surface 22 of the ink spot 21. In addition, in the liquid form in which it is applied, it should have a surface tension low enough that it spreads along the surface of the substrate and the surface of the ink spot. As a result, the layer 23 is thick at the angular intersection 26 of the surfaces 22 and 25 and is relatively thinner where those surfaces are spaced from the intersection 26, such as at the top of the spot 21 and in the portion of the surface 25 between the spot 21 and an adjacent spot. The layer 23 may, of course, be as thick or thicker than the spot 21, in which case the surface 24 will be approximately parallel to the surface 25 throughout.

In addition, the index of refraction of the layer 23 should be approximately the same as that of the ink spot 21 so that there will be no substantial deviation of a ray passing from the ink spot 21 through the interface 22 into the layer 23. For this purpose, the index of refraction of the layer 23 should be within about 10%, and preferably within about 5%, of the index of refraction of the ink spot.

If the substrate 20 is a flexible sheet, the material of the layer 23 should be similarly flexible so as to avoid separation or flaking when the transparency is bent. For convenience in applying the layer 23 to the substrate, the coating material which forms the layer should preferably be one which dries or solidifies within a reasonable time and in such a manner as to avoid formation of bubbles or surface defects. Any solvent contained in the coating material must, of course, be compatible with the materials in the ink spot 21 and the substrate. Hot melt inks are usually made with natural or synthetic waxes, and the coating material should not dissolve or degrade such constituents.

In particular, transparent polyurethane and acrylic coatings are especially suitable, provided they are compatible with the substrate 20 and the ink spot 21 and form a coating which is defect-free and adherent so that no flaking will occur. An especially suitable coating material is provided by an aqueous polyurethane emulsion containing about 35% polyurethane and about 5% to 6% methylethylketone or Nmethylpyrolidone, such as the material marketed as "LP 129" by Compo Industries.

The substrate 20 may be any conventional transparent substrate which is compatible with the materials in the ink spot 21 and the layer 23. Polyester substrates, such as the sheet materials marketed as optical base "Mylar", 3M Scotch Brand No. 501 and Arkwright No. 723 are especially suitable. Preferably, the surfaces of the substrate are smooth rather than being roughened.

The effect of the coating 23 on transmission of light through the ink spot is illustrated by the paths of the light rays shown in FIG. 2. In this illustration the spot 21 has the same shape as the spot 11 in FIG. 1, and it is assumed that the layer 23 has the same index of refraction as that of the ink spot. The rays 15'-19' in FIG. 2 correspond to the entering rays 15-19, respectively, in FIG. 1, but, as shown in FIG. 2, they pass through the interface 22 between the ink spot and the layer 23 without deviation because the index of refraction on both sides of the interface is the same.

In the example shown in FIG. 2, the surface 24 of the layer 23 is shaped so that the rays 16' and 17' are incident on that surface at an angle of 10 degrees and the rays 18' and 19' are incident at an angle of 12 degrees. As a result, the emerging rays are deviated by angles of only about 4.5 and 5.6 degrees, respectively, as shown in FIG. 2. Consequently, all of those rays are well within the 7.2 degree half angle subtended by an f/4 projection lens.

Moreover, the rays 27 and 28, which pass through the periphery of the ink spot 21, are incident on the surface 24 of the layer 23 at an angle of 14 degrees, resulting in a deviation of only about 6.6 degrees from the direct line between the spot and the center of the projection lens. As a result, with a coating 23 of the type illustrated in FIG. 2, all of the light incident on an ink pattern containing ink spots such as the ink spot 23 will be transmitted to a projection lens having an f/4 aperture, producing a clear, bright, full-color image.

In this connection, it will be noted that the surface 24 of the layer 23 surprisingly need not be closely parallel to the surface 25 of the substrate 20, but can provide the desired result while deviating from such parallelism by angles up to a maximum angle which is somewhat greater than the angle subtended by the projection lens. In the illustrated example, the maximum deviation of the surface 24 from a plane parallel to the surface 25 is about 15 degrees. Moreover, even greater deviations from parallelism of the surface 24 with the surface 25 of the substrate at locations near the edges of the ink spot are possible. For example, a deviation of 20 degrees of the surface 24 from a parallel plane at the periphery of the ink spot, producing an incident ray deviation of about 9.8 degrees, would result in only a minor loss of light transmitted by the ink spot with a projection lens aperture of f/4, and no loss with a projection lens having an aperture 50% larger, which would subtend a half angle of 10.7 degrees as described with respect to the rays 18 and 19 in FIG. 1.

The layer 23 providing the desired characteristics may be applied to a substrate 20 having ink drops 21 in any conventional manner, so long as enough coating material is provided to produce a surface 24 which has an angle of deviation from a parallel plane in the region covering the spot 21 which is small enough to deviate most of the rays passing through the spot by an angle less than the half angle subtended by the aperture of the projection lens. In the example shown in FIG. 2, the deviation from parallelism is about 15 degrees, but, as mentioned above, it may be as great as about 20 degrees. Typical coating techniques include spraying, immersion and roll-coating. The thickness of the coating is then adjusted by removing excess coating material by using a squeegee, doctor blade, metering rod, etc., and, depending upon the solvent or carrier for the coating material, the coating may be dried by directing air against the layer, with or without application of heat.

Although the invention has been described herein with reference to specific embodiments, many modifications and variations of the invention will be obvious to those skilled in the art. For example, in addition to the hot melt inks discussed above, the invention is useful to provide transparencies made with any other marking material which forms a three-dimensional spot with a curved surface. Accordingly, all such variations and modifications are included within the intended scope of the invention as defined by the following claims.

We claim:

1. A transparency comprising a transparent substrate, a translucent or transparent ink pattern on the substrate in the form of three-dimensional ink spots having curved surfaces, and a transparent layer on the substrate and the ink spots made of a material which wets the substrate and the ink spots and has approximately the same index of refraction as that of the ink spots.

2. A transparency according to claim 1 wherein the transparent layer is thicker in the regions near the peripheries of the ink spots than in regions near the center of the ink spots.

3. A transparency according to claim 1 wherein the surface of the transparent layer in the regions over the ink spots deviates from a plane parallel to the plane of the substrate by no more than about 20 degrees.

4. A transparency according to claim 1 wherein the index of refraction of the layer differs from that of the ink spots by no more than about 10%.

5. A transparency according to claim 4 wherein the index of refraction of the layer differs from that of the ink spots by no more than about 5%.

6. A transparency according to claim 1 wherein the substrate is a sheet of polyester material.

7. A transparency according to claim 1 wherein the ink in the ink spots is a wax-based ink.

8. A transparency according to claim 1 wherein the transparent layer comprises a polyurethane material.

9. A transparency according to claim 1 wherein the transparent layer comprises an acrylic material.

* * * * *